US012665455B2

(12) United States Patent (10) Patent No.: US 12,665,455 B2

Min et al. (45) Date of Patent: Jun. 23, 2026

(54) FLUX CONCENTRATE TYPE MOTOR

(71) Applicant: LG Electronics Inc., Seoul (KR)

(72) Inventors: Younggeun Min, Seoul (KR); Jaeho Kim, Seoul (KR); Hongsik Hwang, Seoul (KR); Kyungho Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 405 days.

(21) Appl. No.: 18/221,609

(22) Filed: Jul. 13, 2023

(65) Prior Publication Data

US 2024/0266894 A1 Aug. 8, 2024

(30) Foreign Application Priority Data

Feb. 6, 2023 (KR) ........................ 10-2023-0015526

(51) Int. Cl.
H02K 1/276 (2022.01)

(52) U.S. Cl.
CPC ....... H02K 1/2773 (2013.01); H02K 2213/03 (2013.01)

(58) Field of Classification Search
CPC .. H02K 1/2773; H02K 2213/03; H02K 1/276; H02K 1/16; H02K 21/14; H02K 2201/06
See application file for complete search history.

(56) References Cited

U.S. PATENT DOCUMENTS

| 11,128,185 B2 | 9/2021 | Zhang et al. | |
| 2017/0187256 A1* | 6/2017 | Zhang | H02K 1/2766 |
| 2023/0028450 A1 | 1/2023 | Bastien et al. | |
| 2023/0120874 A1* | 4/2023 | Kim | H02K 1/2773 |
| | | | 310/156.56 |

FOREIGN PATENT DOCUMENTS

| CN | 106357025 | | 1/2017 |
| CN | 107394927 | A | 11/2017 |
| JP | 2014-230348 | A | 12/2014 |
| JP | 2015-070721 | A | 4/2015 |
| KR | 10-1926850 | B | 12/2018 |

OTHER PUBLICATIONS

Extended European Search Report in European Appln. No. 23189960.0, mailed on Jan. 22, 2024, 6 pages.
Office Action in Korean Appln. No. 10-2023-0015526, mailed on Jul. 19, 2924, 13 pages (with English translation).
Notice of Allowance in Korean Appln. 10-2023-0015526, mailed on May 12, 2025, 8 pages (with English translation).

* cited by examiner

*Primary Examiner* — Christopher M Koehler
*Assistant Examiner* — Riley Owen Stout
(74) *Attorney, Agent, or Firm* — Fish & Richardson P.C.

(57) ABSTRACT

A flux concentrate type motor includes a rotor core including an inner diameter portion core, a plurality of outer diameter portion cores, and a plurality of bridges connecting the plurality of outer diameter portion cores to the inner diameter portion core; and a plurality of arc type permanent magnets each inserted between two adjacent outer diameter portion cores. A first angle θ1 formed between a first extension line connecting a center of the arc type permanent magnet and a center of the inner diameter portion core and a second extension line connecting a center of an outer arc of the outer diameter portion core and the center of the inner diameter portion core may satisfy: θ1=k1×PA (k1 is 0.16 to 0.55, and PA=360°/(2×P(a number of pole of the permanent magnet)), where the first angle θ1 may be between 4° and 10°.

20 Claims, 12 Drawing Sheets

FIG. 3
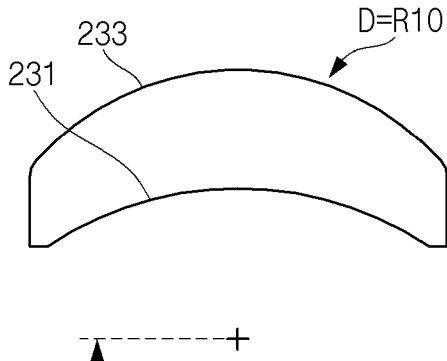
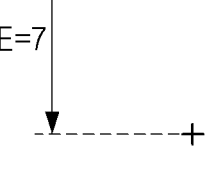
FIG. 4

FLUX CONCENTRATE TYPE MOTOR

CROSS-REFERENCE TO RELATED APPLICATION

This application claims priority to and the benefit of Korean Patent Application No. 10-2023-0015526, filed in the Korean Intellectual Property Office on Feb. 6, 2023.

TECHNICAL FIELD

The present disclosure relates to a flux concentrate type motor, more specifically, to a flux concentrate type motor having an arc type permanent magnet.

BACKGROUND

A motor obtains rotational force from electrical energy, and includes a stator and a rotor. The rotor is configured to interact electromagnetically with the stator, and is rotated by a force acting between a magnetic field and a current flowing through a coil.

The motor using a permanent magnet to generate a magnetic field is divided into a surface mounted motor and an interior permanent magnet motor based on the coupling structure of the permanent magnet installed in the rotor core.

A permanent magnet surface-attached motor has permanent magnets that are attached to the surface of the core of the rotor, and has relatively low noise and vibration and good rotational force, but has disadvantages because it is not easy to control for the separation of the permanent magnet during high-speed rotation. Further, it may decrease in mechanical rigidity, and may be inferior in terms of the diversification of the operating range.

In addition, the permanent magnet embedded motor has a permanent magnet that is inserted and fixed into an embedded hole formed by vertically penetrating the core of the rotor, and has a characteristic that the reluctance torque is added by the structure of the salient pole, so the torque and output are increased compared to the permanent magnet surface-attached motor in addition to the magnetic torque.

On the other hand, a flux concentrate type motor has been developed, which further improves efficiency of the motor by further improving torque and output compared to the permanent magnet embedded motor. The flux concentrate type motor may be also referred to as a spoke type motor.

The flux concentrate type motor can generate high torque and high output because the flux concentration is structurally high, and the rotor can be miniaturized for the same output. Therefore, it can be applied to driving motors such as washing machines, air conditioners, and electric vehicles that require high torque and high output characteristics.

In general, the flux concentrate type rotor provided in the flux concentrate type motor includes a square bar type permanent magnet radially disposed around a shaft, and a rotor core provided to support the square bar type permanent magnets and form a path of flux.

The rotor core may include yokes disposed between the respective bar type permanent magnets, and a cylindrical base positioned between the shaft and the permanent magnets and connected to each of the yokes.

However, when the flux concentrate type rotor to which the square bar type permanent magnet is applied is formed in an open slot structure, mechanical strength may be weakened because the force of magnet scattering is concentrated on the fixing protrusions formed on both side edges of the outer end of the outer diameter portion core.

In the case of a flux concentrate type rotor having a bar type permanent magnet, there is a limit in increasing the pole arc of the magnet due to the shape of the permanent magnet.

Therefore, a flux concentrate type rotor having an arc type permanent magnet capable of increasing the pole arc compared to a bar type permanent magnet in the same rotor size has been developed.

Related art as to a flux concentrate type rotor having an arc type permanent magnet fails to disclose the performance of each design factor of the arc type permanent magnet for maximizing the performance of the motor, and fails to disclose the shape design of the arc type permanent magnet.

In particular, in the flux concentrate type rotor having the arc type permanent magnet, a back electromotive force compared to magnet usage is changed and a curvature of the permanent magnet at which the back electromotive force compared to magnet usage may be maximized. However, no research has been conducted on this in the conventional flux concentrate type rotor including such related art.

SUMMARY

The present disclosure provides a flux concentrate type motor that maximizes performance compared to magnet usage by selecting an appropriate curvature of an arc type permanent magnet.

The present disclosure provides a flux concentrate type motor having an arc type permanent magnet that can effectively increase a back electromotive force compared to magnet usage in the same rotor size.

The present disclosure provides a flux concentrate type motor having an arc type permanent magnet that can maximize a back electromotive force.

The present disclosure provides a flux concentrate type motor having a flux concentrate type rotor that increases mechanical rigidity by effectively dispersing the force of magnet scattering while adopting an open slot structure.

A flux concentrate type motor according to an aspect of the present disclosure may comprise a rotor core including an inner diameter portion core, a plurality of outer diameter portion cores, and a plurality of bridges connecting the plurality of outer diameter portion cores to the inner diameter portion core; and a plurality of arc type permanent magnets each inserted between two adjacent outer diameter portion cores.

And, a first angle $\theta 1$ formed between a first extension line connecting a center of the arc type permanent magnet and a center of the inner diameter portion core and a second extension line connecting a center of an outer arc of the outer diameter portion core and the center of the inner diameter portion core may satisfy Equation (1) below:

$$\theta 1 = k1 \times PA, \tag{1}$$

$$PA = 360°/(2 \times P),$$

where k1 is 0.16 to 0.55, and P is a number of pole of the permanent magnet.

The first angle $\theta 1$ may be between 4° and 10°.

According to this configuration, the arc type permanent magnets can be installed on the rotor core to maximize back electromotive force compared to magnet usage depending on the shape of the arc type permanent magnet, for example, outer diameter portion curvature and inner diameter portion curvature of the arc type permanent magnet.

A width B of the arc type permanent magnet may satisfy Equation (2) below:

$$B = k2 \times B'(k2 \text{ is } 0.5 \text{ to } 0.75, \text{ and } B' \text{ is a radius of the rotor core}). \quad (2)$$

According to this configuration, the arc type permanent magnet can be designed so that the back electromotive force compared to magnet usage is maximized.

The arc type permanent magnet may include an inner diameter portion formed with a first curvature, an outer diameter portion formed with a second curvature different from the first curvature, and a connecting portion connecting an end portion of the inner diameter portion to an end portion of the outer diameter portion.

And, a second angle θ2 formed between a third extension line connecting the center of the inner diameter portion and the center of the inner diameter portion core and a fourth extension line connecting a center of the outer diameter portion and the center of the inner diameter portion core may satisfy Equation (3) below:

$$\theta 2 = k3 \times PA, \quad (3)$$
$$PA = 360°/(2 \times P),$$

where k3 is 0.7 to 0.9, and P is a number of pole of the permanent magnet.

According to this configuration, the arc type permanent magnet can be installed so that the back electromotive force compared to magnet usage is maximized.

The connecting portion may include a first straight portion connected to the end portion of the outer diameter portion and a second straight portion connecting an end portion of the first straight portion and the end portion of the inner diameter portion.

And, a third angle θ3 of 5° to 20° may be maintained between a fifth extension line connecting a center of the first straight portion formed at one end portion of the arc type permanent magnet from the center of the inner diameter portion core and a sixth extension line connecting the center of the first straight portion formed at other end portion of the arc type permanent magnet from the center of the inner diameter portion core.

According to this configuration, the back electromotive force can be further increased by optimizing an arrangement angle or embedding angle of the arc type permanent magnet.

The outer diameter portion core may include a first side in contact with an inner diameter portion of a first arc type permanent magnet among two arc type permanent magnets adjacent to each other, a second side in contact with an outer diameter portion of a second arc type permanent magnet positioned on the opposite side of the first side of the two arc type permanent magnets, and a first incision positioned at a lower end portion, and the first incision may extend from an end portion of a second side of the outer diameter portion core toward the first side.

According to this configuration, since the magnetic flux is bent and flows due to the first incision, the leakage path of the magnetic flux is relatively increased, the magnetic resistance is increased, and the amount of leakage flux through the bridge is reduced.

Accordingly, the back electromotive force of the motor may be increased, performance of the motor may be improved, and power density of the motor may be increased.

The bridge may include a first side extending from an end portion of a first side of the outer diameter portion core and connected to the inner diameter portion core and a second side opposite to a first side of the bridge and connected to the inner diameter portion core.

A second side of the bridge may be spaced apart from an end portion of the outer diameter portion of the second arc type permanent magnet toward the first side of the outer diameter portion core.

A portion of the first side of the bridge may be in contact with at least a portion of a connecting portion of the first arc type permanent magnet.

The first incision may extend toward the first side of the outer diameter portion core from a point where a first straight portion of the first arc type permanent magnet and a lower end portion of the second side of the outer diameter portion core are connected.

The second side of the bridge may extend from an end portion of the first incision and may be connected to the inner diameter portion core.

A portion where the second side of the bridge and the end portion of the first incision are connected may be positioned radially outward from the first straight portion of the first arc type permanent magnet.

The first incision and the second side of the bridge may form an acute angle.

The first incision may be parallel to at least a portion of the connecting portion of the first arc type permanent magnet.

The outer diameter portion core may further include a second incision extending radially outward from the end portion of the first incision.

According to this configuration, compared to the case with only the first incision, since the magnetic flux is more bent and flows due to the second incision, the leakage path of the magnetic flux is relatively more increased, so that the magnetic resistance is further increased, and the amount of leakage flux through the bridge may be further reduced.

The second side of the bridge may extend from an end portion of the second incision and may be connected to the inner diameter portion core.

A portion where the second side of the bridge and the end portion of the second incision are connected may be positioned radially outward from the first straight portion of the first arc type permanent magnet.

The second incision and the second side of the bridge may form an acute angle.

The first incision may be formed parallel to at least a portion of a connecting portion of the arc type permanent magnet.

The arc type permanent magnet may satisfy at least one of 5 Equations below:

$$A = k4 \times C(k4 \text{ is } 0.31 \text{ to } 0.37), \quad (4)$$
$$B = k5 \times A(k5 \text{ is } 2.9 \text{ to } 3.75), \quad (5)$$
$$B = k6 \times E(k6 \text{ is } 1.8 \text{ to } 2.7), \quad (6)$$
$$D = k7 \times C(k7 \text{ is } 0.62 \text{ to } 0.98), \text{ and} \quad (7)$$
$$M = (C/D) \times A/(C - D)(M \text{ is greater than or equal to } 2.5). \quad (8)$$

In the above Equations (4) to (8), A is a thickness of the arc type permanent magnet, B is a width of the arc type permanent magnet, C is a first curvature of the inner diameter portion, D is a second curvature of the outer diameter portion, and E is a magnetization center point gap.

According to this configuration, by designing the arc type permanent magnet using five variables (e.g., magnet thickness, magnet width, first curvature of the inner diameter portion, second curvature of the outer diameter portion, and magnetization center point gap), it is possible to manufacture an arc type permanent magnet with a high back electromotive force compared to magnet usage, and it is possible to manufacture an arc type permanent magnet with a maximized back electromotive force.

According to the present disclosure, it is possible to maximize the performance of the flux concentrate type motor compared to the magnet usage through an appropriate selection of the curvature of the arc type permanent magnet.

In addition, it is possible to effectively increase the back electromotive force compared to the magnet usage in a magnetic flux concentrate type motor having the same rotor size.

In addition, it is possible to increase the mechanical rigidity of the flux concentrate type motor by effectively dispersing the force of magnet scattering while adopting the open slot structure.

In addition, by designing the arc type permanent magnet using five variables (e.g., magnet thickness, magnet width, first curvature of the inner diameter, second curvature of the outer diameter, and magnetization center point gap), it is possible to manufacture an arc type permanent magnet with a high back electromotive force compared to magnet usage, and it is possible to manufacture an arc type permanent magnet with a maximized back electromotive force.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included as a part of the detailed description to help the understanding of the present disclosure, provide implementations of the present disclosure, and together with the detailed description, describe the technical features of the present disclosure.

FIG. 3 is a view showing an arc type permanent magnet in which a second curvature of an outer diameter portion and a magnetization center point gap of the arc type permanent magnet shown in FIG. 1 are changed.

FIG. 4 is a view showing an arc type permanent magnet in which a first curvature of an inner diameter portion and a magnetization central point gap of the arc type permanent magnet shown in FIG. 1 are changed.

DETAILED DESCRIPTION

Figure 1:
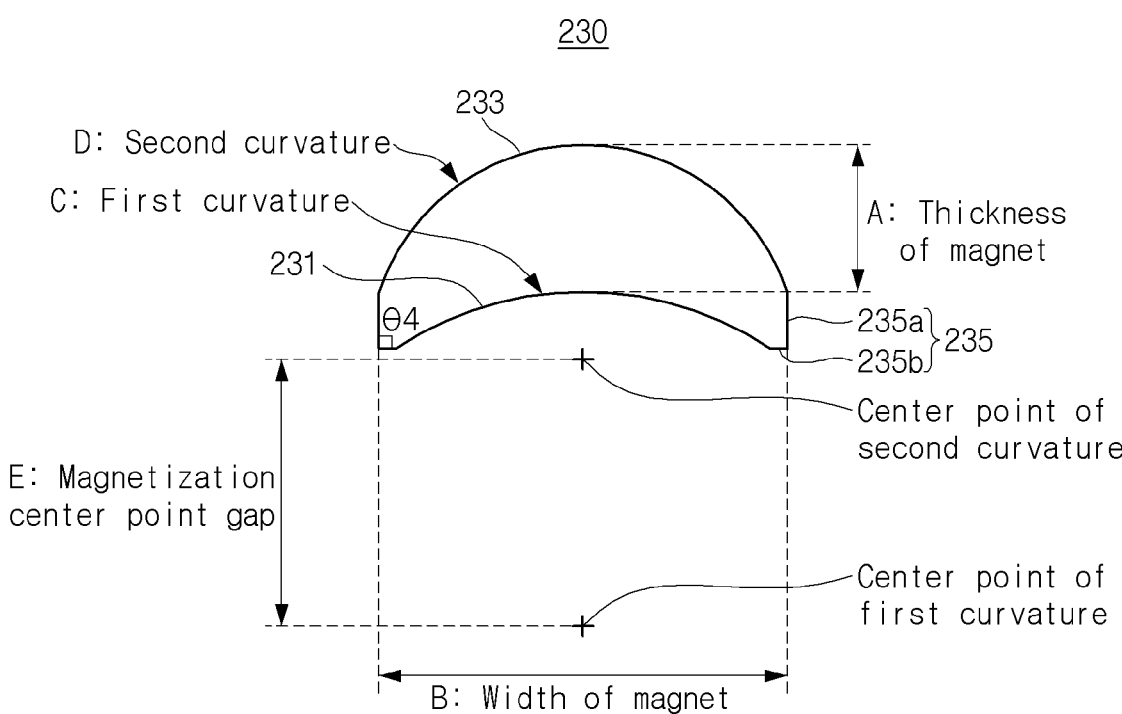
FIG. 1 is a cross-sectional view showing an arc type permanent magnet with maximized magnet usage.

Hereinafter, implementations disclosed in the present disclosure will be described in detail with reference to the accompanying drawings, however, regardless of the reference numerals, the same or similar elements will be given the same reference numerals and redundant description thereof will be omitted.

In addition, the accompanying drawings are only for easily understanding the implementations disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

While terms, such as "first", "second", etc., may be used to describe various elements, such elements must not be limited by the above terms. The above terms are used only to distinguish one element from another.

When an element is referred to as being "coupled" or "connected" to another element, it may be directly coupled to or connected to the other element, however, it should be understood that other elements may exist in the middle.

On the other hand, when an element is referred to as being "directly coupled" or "directly connected" to another element, it should be understood that there are no other elements in the middle.

The singular forms are intended to include the plural forms as well, unless the context clearly indicates otherwise.

In addition, in the present disclosure, it should be understood that the terms "comprise" and "have" specify the presence of stated features, integers, steps, operations, elements, parts, or combinations thereof, but do not preclude the presence or addition of one or more other features, integers, steps, operations, elements, parts, or combinations thereof.

FIG. 1 is a cross-sectional view showing an arc type permanent magnet with maximized magnet usage. FIGS. 2 to 6 are diagrams illustrating arc type permanent magnets according to implementations when at least two of five design elements are changed.

First, referring to FIG. 1, an arc type permanent magnet 230 is an arc type permanent magnet having an inner diameter portion 231 formed with a first curvature C and an outer diameter portion 233 formed with a second curvature D.

In this implementation, the second curvature D of the outer diameter portion 233 and the first curvature C of the inner diameter portion 231 are different from each other.

That is, the second curvature D of the outer diameter portion 233 may be greater than the first curvature C of the inner diameter portion 231, and the first curvature C of the inner diameter portion 231 may be greater than the second curvature of the outer diameter portion 233.

However, the second curvature D of the outer diameter portion 233 and the first curvature C of the inner diameter portion 231 may be the same.

The arc type permanent magnet 230 may further include a connecting portion 235 connecting an end portion of the inner diameter portion 231 and an end portion of the outer diameter portion 233, and the connecting portion 235 may include a first straight portion 235a connected to the end portion of the outer diameter portion 233 and a second straight portion 235b connecting the end portion of the first straight portion 235a and the end portion of the inner diameter portion 231.

Also, the first straight portion 235a and the second straight portion 235b may be formed to have a fourth angle θ4 of 90 degrees.

FIG. 1 shows the arc type permanent magnet 230 in which the first curvature C of the inner diameter portion 231 is R12.5, the second curvature D of the outer diameter portion 233 is R8.0, and a magnetization center point gap E is 10.0.

Here, the magnetization center point gap E means a distance between the center point of the first curvature C and the center point of the second curvature D.

The arc type permanent magnet 230 shown in FIG. 1 has a thickness A of 5.5 and a width B of 15.1.

Figure 2:
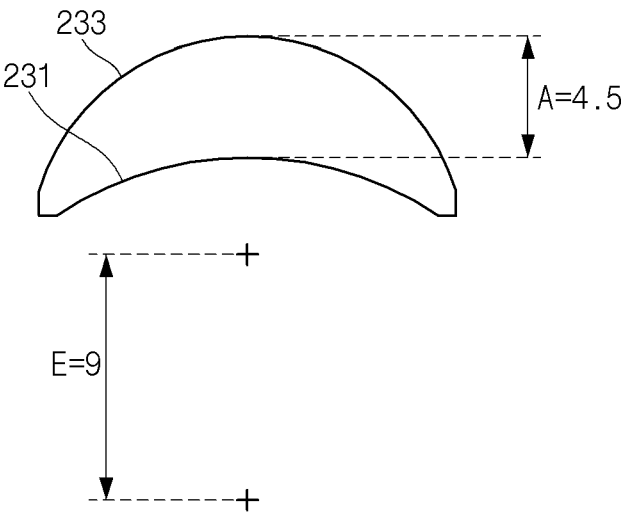
FIG. 2 is a view showing an arc type permanent magnet in which a thickness and a magnetization center point gap of the arc type permanent magnet shown in FIG. 1 are changed.

FIG. 2 is a view showing an arc type permanent magnet in which a thickness and a magnetization center point gap of the arc type permanent magnet shown in FIG. 1 are changed.

In the arc type permanent magnet of the present implementation, the design factors other than the thickness A and the magnetization center point gap E, that is, the width B, the first curvature C of the inner diameter portion, and the second curvature D of the outer diameter portion, have the same values as those of the arc type permanent magnet of FIG. 1.

The thickness A of the arc type permanent magnet shown in FIG. 2 is 4.5, and the magnetization center point gap E is 9.

FIG. 3 is a view showing an arc type permanent magnet in which a second curvature of an outer diameter portion and a magnetization center point gap of the arc type permanent magnet shown in FIG. 1 are changed.

In the arc type permanent magnet of the present implementation, the remaining design factors other than the second curvature D of the outer diameter portion and the magnetization center point gap E, that is, the width B and the first curvature C of the inner diameter portion and the thickness A have the same values as those of the arc type permanent magnet of FIG. 1.

The second curvature D of the outer diameter portion of the arc type permanent magnet shown in FIG. 3 is R10.0, and the magnetization center point gap is 7.

FIG. 4 is a view showing an arc type permanent magnet in which a first curvature of an inner diameter portion and a magnetization central point gap of the arc type permanent magnet shown in FIG. 1 are changed.

In the arc type permanent magnet of the present implementation, the design factors other than the first curvature C of the inner diameter portion and the magnetization center point gap E, that is, the thickness A and the width B, and the second curvature D of the outer diameter portion, have the same values as those of the arc type permanent magnet of FIG. 1.

The first curvature C of the inner diameter portion of the arc type permanent magnet shown in FIG. 4 is R10.5, and the magnetization center point gap E is 5.

Figure 5:
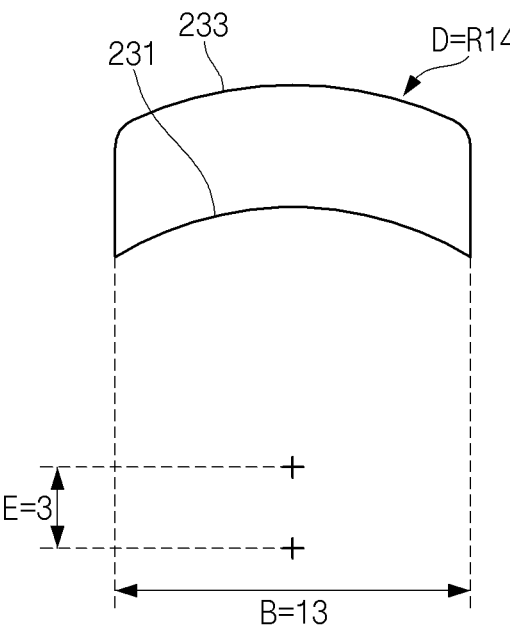
FIG. 5 is a view showing an arc type permanent magnet in which a width, a second curvature of an outer diameter portion, and a magnetization center point gap of the arc type permanent magnet shown in FIG. 1 are changed.

FIG. 5 is a view showing an arc type permanent magnet in which a width, a second curvature of an outer diameter portion, and a magnetization center point gap of the arc type permanent magnet shown in FIG. 1 are changed.

In the arc type permanent magnet of the present implementation, the remaining design factors other than the width B, the second curvature D of the outer diameter portion and the magnetization center point gap E, that is, the thickness A and the first curvature C of the inner diameter portion have the same values as those of the arc type permanent magnet of FIG. 1.

The width B of the arc type permanent magnet shown in FIG. 5 is 13, the second curvature D of the outer diameter portion is R14.0, and the magnetization center point gap E is 3.

Figure 6:
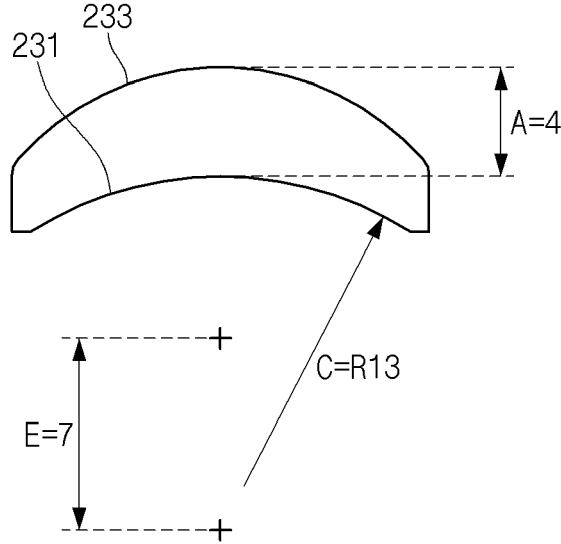
FIG. 6 is a view showing an arc type permanent magnet in which a thickness and a first curvature of an inner diameter portion of an arc type permanent magnet shown in FIG. 1 are changed.

FIG. 6 is a view showing an arc type permanent magnet in which a thickness and a first curvature of an inner diameter portion of an arc type permanent magnet shown in FIG. 1 are changed.

In the arc type permanent magnet of the present implementation, the design factors other than the thickness A and the first curvature C of the inner diameter portion, that is, the width B, and the second curvature D of the outer diameter portion, and the magnetization center point gap E have the same values as those of the arc type permanent magnet of FIG. 1.

The thickness A of the arc type permanent magnet shown in FIG. 6 is 4, the first curvature C of the inner diameter portion is R13, and the magnetization center point gap E is 7.

Table 1 below describes the magnet usage, back electromotive force (Bemf), and a ratio of back electromotive force to the magnet usage of each of the arc type permanent magnets shown in FIGS. 1 to 6.

TABLE 1

| | FIG. 1 | FIG. 2 | FIG. 3 | FIG. 4 | FIG. 5 | FIG. 6 |
|---|---|---|---|---|---|---|
| Magnet Usage | 128% | 100% | 109% | 114% | 102% | 96% |
| Back Electromotive Force | 55.8 | 50.9 | 56.1 | 57.1 | 51.7 | 52.8 |
| Back Electromotive Force/Magnet Usage | 0.436 | 0.502 | 0.503 | 0.494 | 0.500 | 0.543 |

Referring to Table 1, it is possible to optimize performance required for a corresponding motor while appropriately changing five design factors, that is, the thickness A, the width B, the first curvature C of the inner diameter portion, the second curvature D of the outer diameter portion, and the magnetization center point gap E.

For example, in the case of air conditioner motors where magnet overhangs are essential to maintain sensor spacing, it is preferable to use the arc type permanent magnet shown in FIG. 4.

Also, it is preferable to use the arc type permanent magnet shown in FIG. 6 as an arc type permanent magnet having a large increase in back electromotive force compared to the magnet usage (e.g., a ratio of back electromotive force to the magnet usage).

For the permanent magnet of the square bar type, the width and thickness of the permanent magnet are used as design factors.

However, it may be difficult to diversify the shape design of the permanent magnet with the above two design factors, and when the outer diameter of the shaft is determined according to the applied product group, the range may be further limited.

In addition, in the case of the square bar type permanent magnet, the thickness of the permanent magnet is highly correlated with the demagnetization of the motor, and the length of the permanent magnet contributes more to improving the back electromotive force of the motor.

However, in the flux concentrate type motor, as the length of the permanent magnet is longer, there is also a problem of poor magnetization of the permanent magnet because the lower end of the permanent magnet is located deeper toward the inner diameter portion core.

However, in the case of the arc type permanent magnet of the present disclosure, when it has the same magnet volume as the square bar type, it is possible to design a short length of the permanent magnet (width of the permanent magnet), and it is possible to design the thickness of both ends of the permanent magnet to be thin, so that it is advantageous compared to the bar type permanent magnets in terms of magnetization.

In addition, according to the present disclosure, it is possible to analyze the effect of increasing the back electromotive force of the motor according to the five design factors (e.g., thickness, width, first curvature of inner diameter portion, second curvature of outer diameter portion, and magnetization center point gap) defined in the present disclosure, and it is possible to maximize the effect of the motor by specifying the ratio for each factor.

Hereinafter, the synergistic effect of the back electromotive force compared to the magnet usage according to the ratio of each factor will be described with reference to FIGS. 7 to 10.

Figure 7:
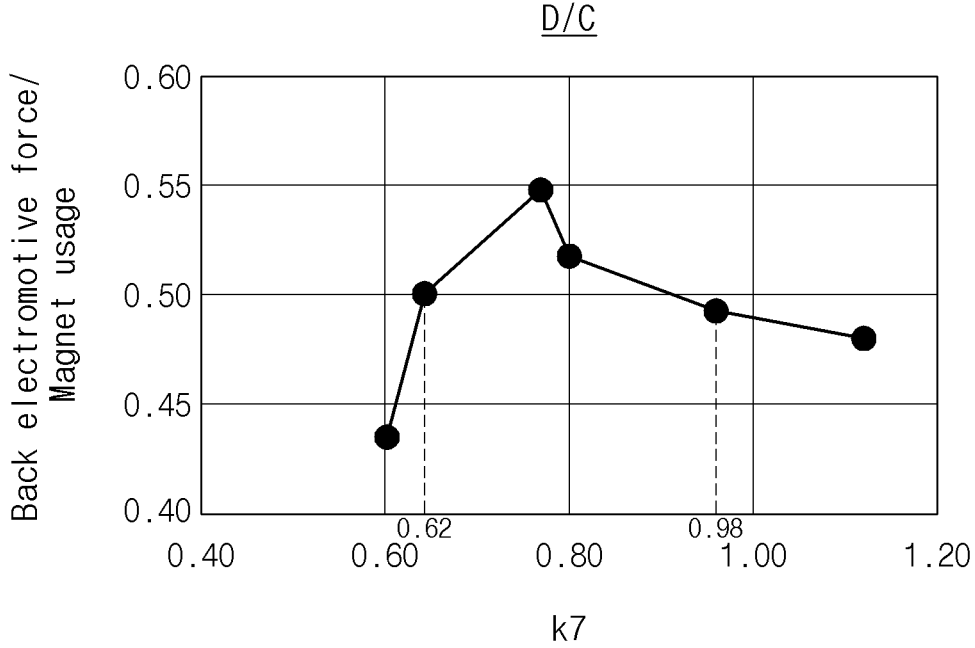
FIG. 7 is a graph showing a magnitude of back electromotive force compared to magnet usage according to a ratio of a first curvature of an inner diameter portion to a second curvature of an outer diameter portion of the arc type permanent magnet.
Figure 8:
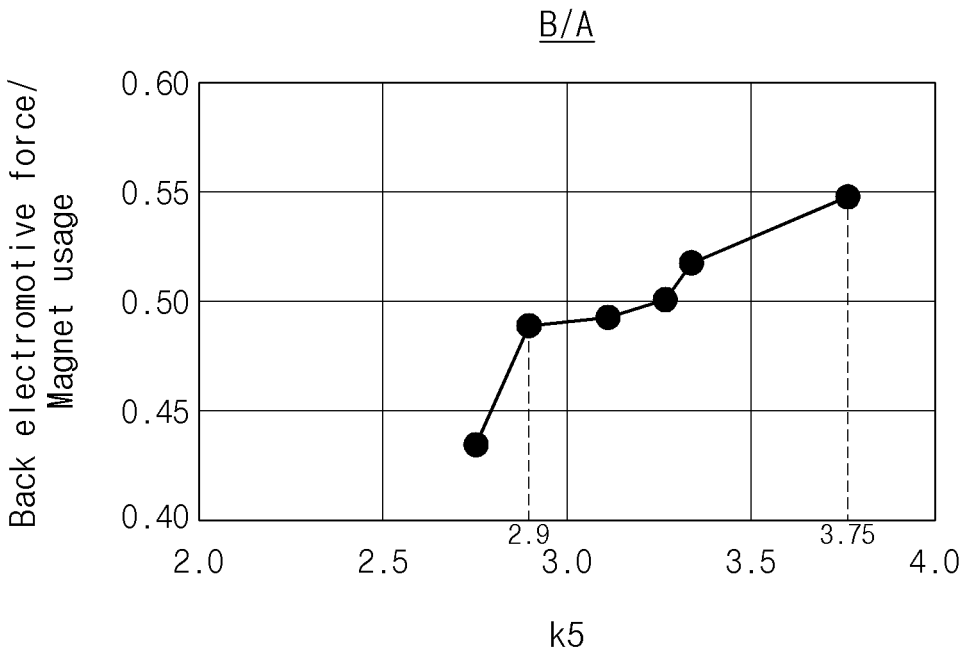
FIG. 8 is a graph showing a magnitude of back electromotive force compared to magnet usage according to a ratio of a thickness to width of the arc type permanent magnet.

FIG. 7 is a graph showing a magnitude of back electromotive force compared to magnet usage according to a ratio of a first curvature of an inner diameter portion to a second curvature of an outer diameter portion of the arc type permanent magnet, and FIG. 8 is a graph showing a magnitude of back electromotive force compared to magnet usage according to a ratio of a thickness to width of the arc type permanent magnet.

Figure 9:
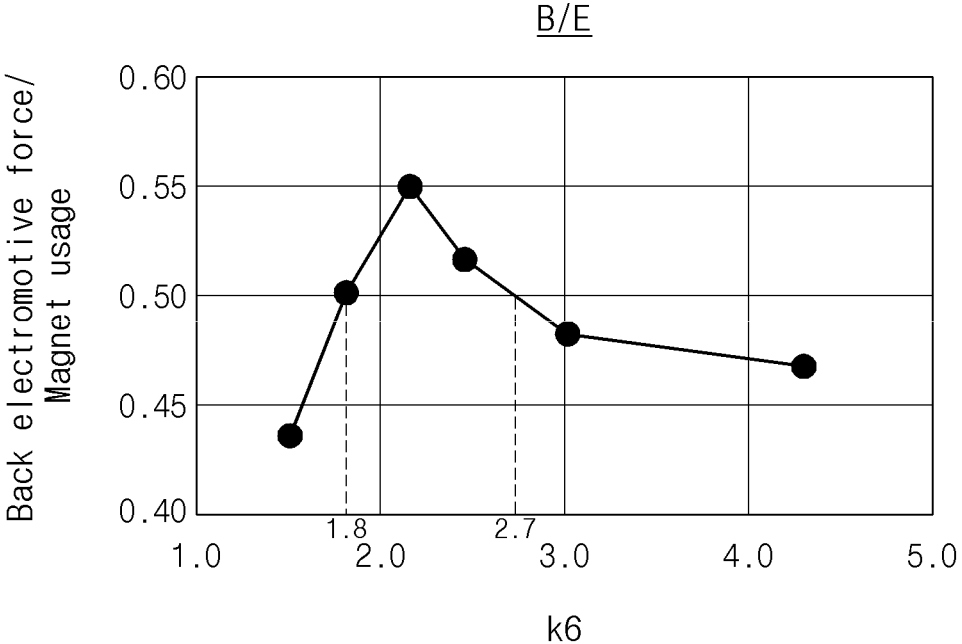
FIG. 9 is a graph showing a magnitude of back electromotive force compared to magnet usage according to a ratio of a magnetization center point gap to a width of the arc type permanent magnet.
Figure 10:
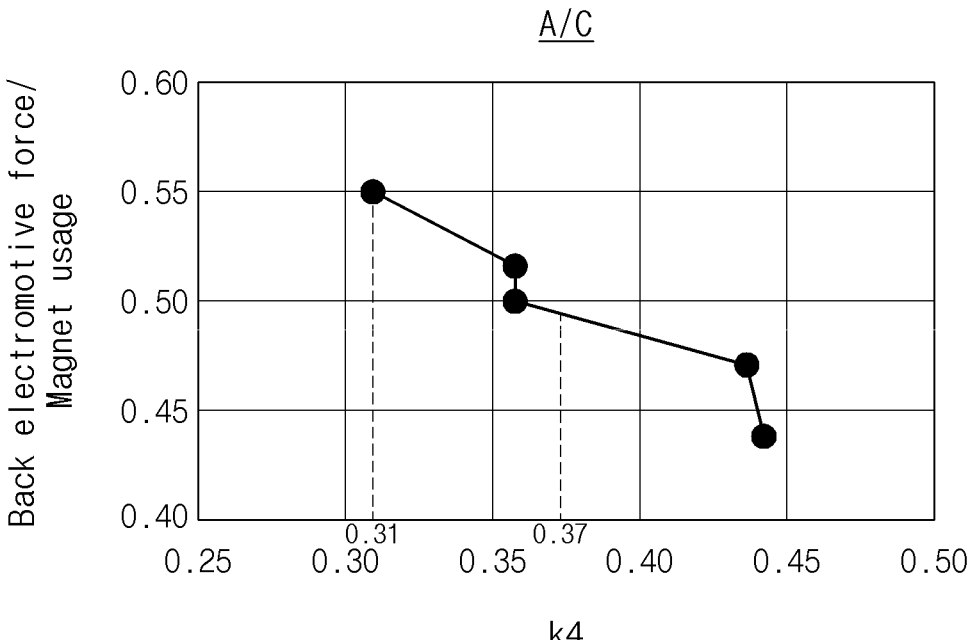
FIG. 10 is a graph showing a magnitude of back electromotive force compared to magnet usage according to a ratio of a first curvature of an inner diameter portion to a thickness of the arc type permanent magnet.

FIG. 9 is a graph showing a magnitude of back electromotive force compared to magnet usage according to a ratio of a magnetization center point gap to a width of the arc type permanent magnet, and FIG. 10 is a graph showing a magnitude of back electromotive force compared to magnet usage according to a ratio of a first curvature of an inner diameter portion to a thickness of the arc type permanent magnet.

Referring to FIGS. 7 to 10, the arc type permanent magnet may be designed to satisfy at least one of Equations (4) to (7) below:

$$A = k1 \times C(k1 \text{ is } 0.31 \text{ to } 0.37); \tag{4}$$

$$B = k2 \times A(k2 \text{ is } 2.9 \text{ to } 3.75); \tag{5}$$

$$B = k3 \times E(k3 \text{ is } 1.8 \text{ to } 2.7); \text{ and} \tag{6}$$

$$D = k4 \times C(k4 \text{ is } 0.62 \text{ to } 0.98). \tag{7}$$

In the above Equations (4) to (7), A is the thickness of the arc type permanent magnet, B is the width of the arc type permanent magnet, C is the first curvature of the inner diameter portion, D is the second curvature of the outer diameter portion, E is the magnetization center point gap.

In Equations (4) to (7), units of the thickness A, width B, and magnetization center point gap E of the arc type permanent magnet may be the same.

For example, units of the thickness A, width B, and magnetization center point gap E of the arc type permanent magnet may be mm or cm.

In the above Equations (4) to (7), when k1 to k4 satisfy the above values, respectively, the back electromotive force compared to the magnet usage (a ratio of back electromotive force/magnet usage) of the arc type permanent magnet is approximately 0.5 or more.

On the other hand, in the case of designing a motor having only excellent back electromotive force than excellent performance of the back electromotive force compared to the magnet usage, the following Equation (8) may be referred to:

$$M = (C/D) \times A/(C - D)(M \text{ is greater than or equal to } 2.5). \tag{8}$$

Figure 11:
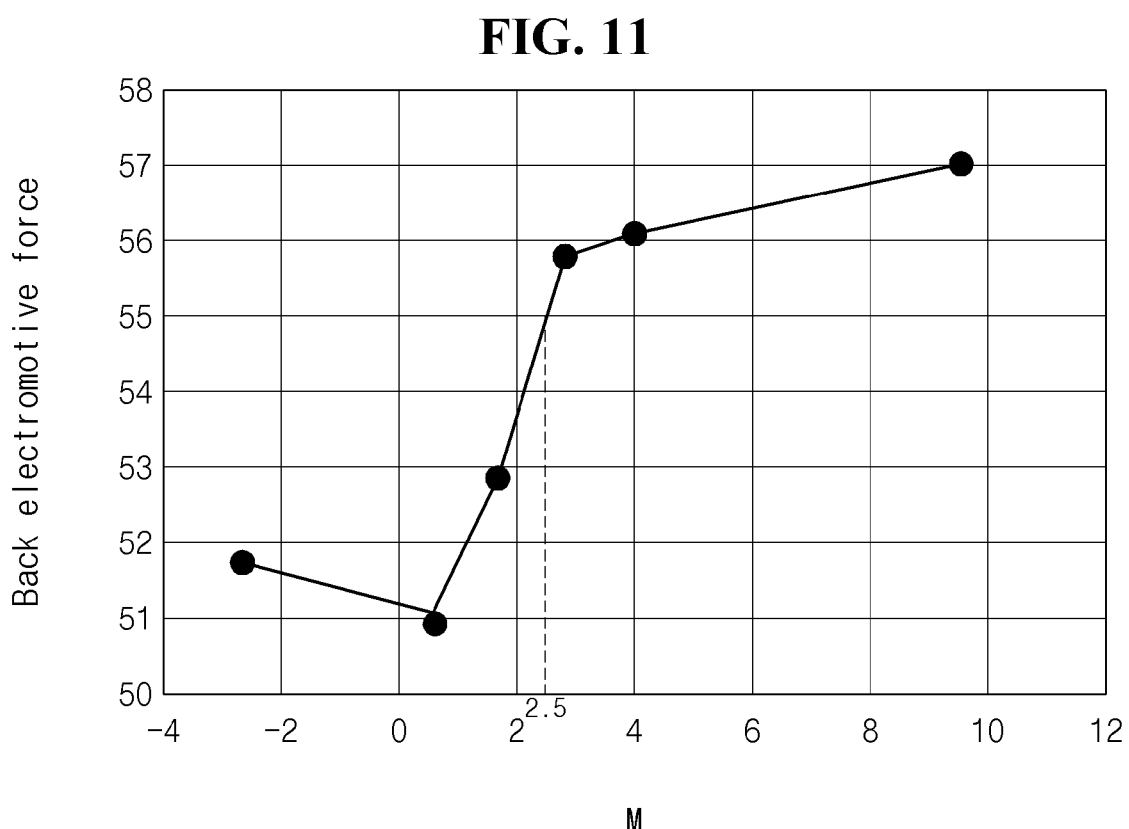
FIG. 11 is a graph showing a magnitude of back electromotive force according to a first curvature of an inner diameter portion, a second curvature of an outer diameter portion, and a thickness of the arc type permanent magnet.

Referring to FIG. 11, it can be seen that the back electromotive force rapidly rises when the design variable "M" exceeds 2, and then the slope becomes less steep.

Therefore, when designing an arc type permanent magnet with maximized back electromotive force, it is preferable to set the design variable "M" to 2.5 or more.

As described above, it is possible to design an arc type permanent magnet to satisfy at least one of the above Equations (4) to (8) according to required performance or conditions of the motor.

Hereinafter, a flux concentrate type motor having an arc type permanent magnet according to the present disclosure will be described.

Figure 12:
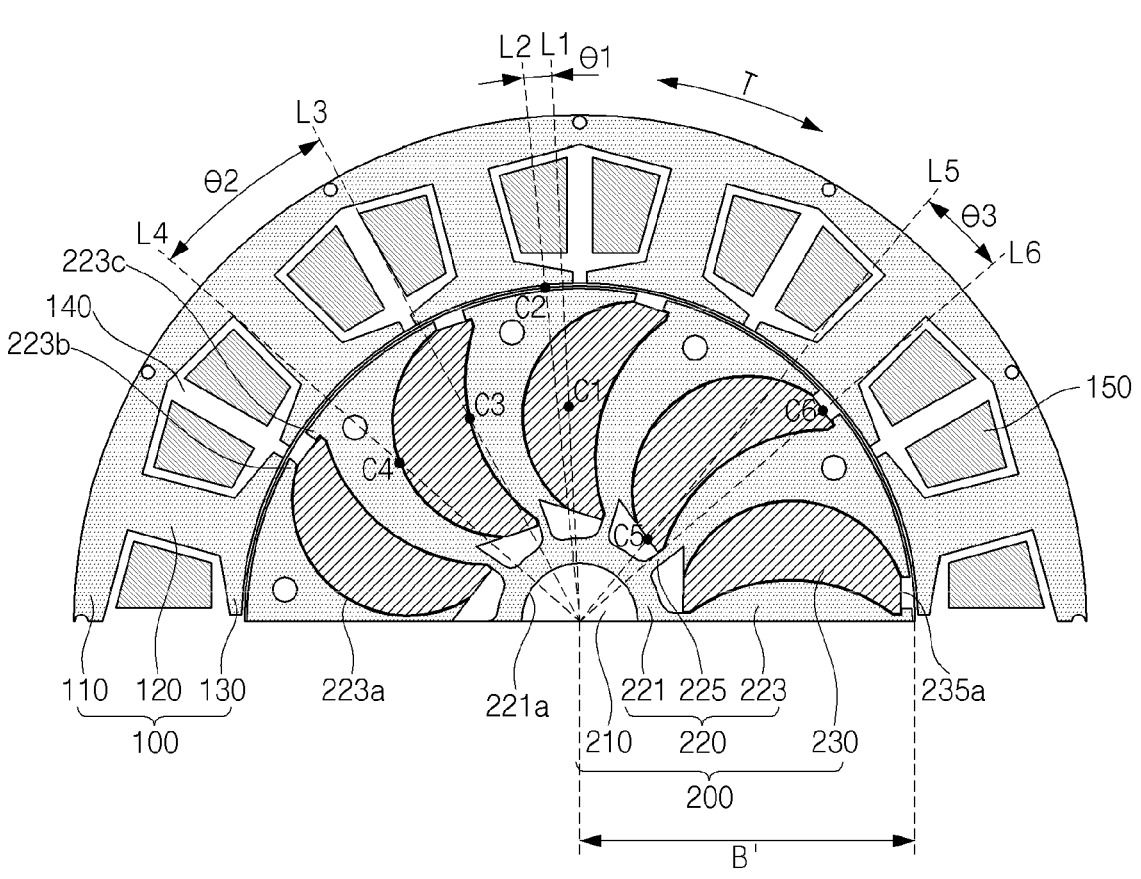
FIG. 12 is a diagram showing a schematic configuration of a flux concentrate type motor according to a first implementation of the present disclosure.
Figure 13:
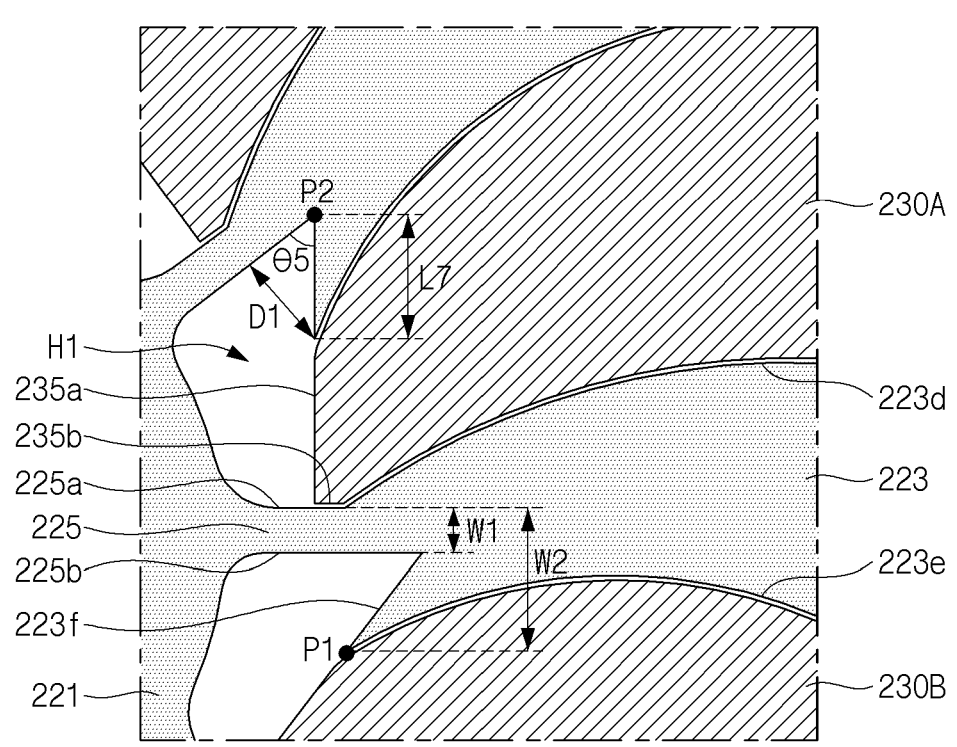
FIG. 13 is a diagram showing a schematic configuration of a rotor core shown in FIG. 12.
Figure 14:
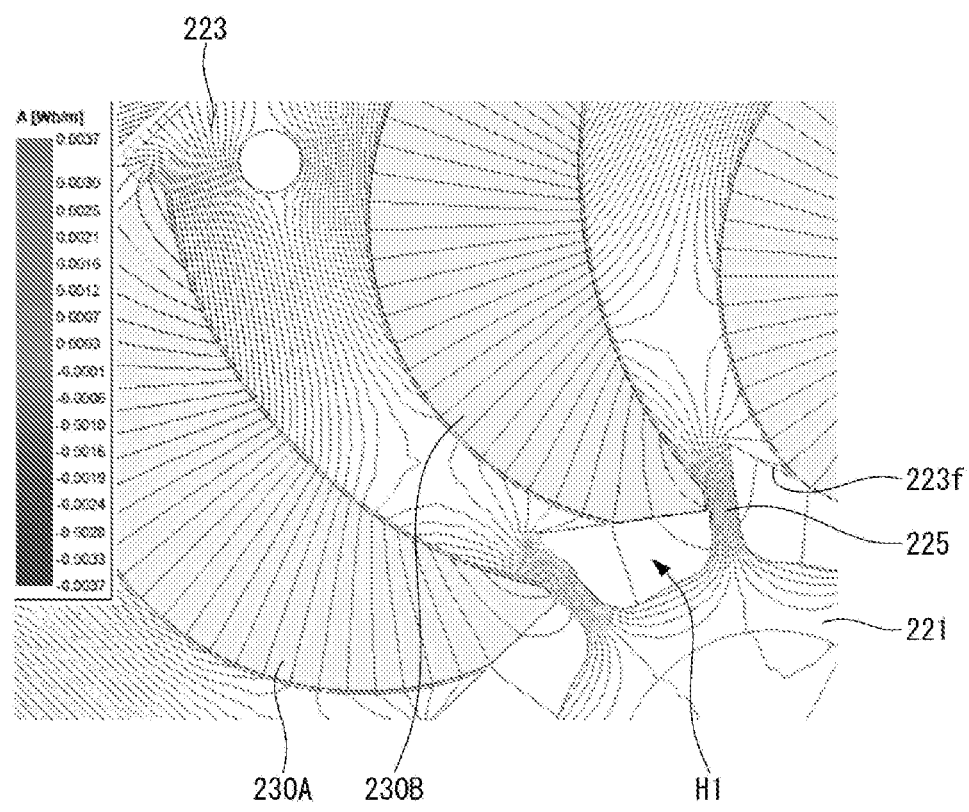
FIG. 14 is a diagram for explaining leakage flux generated in a flux concentrate type motor shown in FIG. 12.

FIG. 12 is a diagram showing a schematic configuration of a flux concentrate type motor according to a first implementation of the present disclosure, and FIG. 13 is a diagram showing a schematic configuration of a rotor core shown in FIG. 12, FIG. 14 is a diagram for explaining leakage flux generated in a flux concentrate type motor shown in FIG. 12.

The flux concentrate type motor includes a stator 100 and a flux concentrate type rotor 200.

The stator 100 may include a stator core 110 and a plurality of teeth 120 protruding in a radial direction from the stator core 110. The stator core 110 may be formed in an annular shape.

A pole shoe 130 extending in both circumferential directions may be provided at radially inner ends of the teeth 120. A slot 140 is formed between the teeth. Thus, a coil 150 is wound through the teeth 120 and the slot 140.

The flux concentrate type rotor 200 includes a shaft 210, a rotor core 220, and the arc type permanent magnet 230.

The arc type permanent magnet 230 is an arc type permanent magnet including the inner diameter portion 231 formed with the first curvature C and the outer diameter portion 233 formed with the second curvature D.

The magnetization direction of each of the arc type permanent magnets 230 proceeds in the tangential direction T, the outer diameter portion 233 side is formed as a strong magnetic flux surface, and the inner diameter portion 231 side is formed as a weak magnetic flux surface.

The arc type permanent magnet 230 may further include a connecting portion 235 connecting an end portion of the inner diameter portion 231 and an end portion of the outer diameter portion 233, and the connecting portion 235 may include a first straight portion 235a connected to the end portion of the outer diameter portion 233 and a second straight portion 235b connecting the end portion of the first straight portion 235a and the end portion of the inner diameter portion 231.

Also, the first straight portion 235a and the second straight portion 235b may be formed to have the fourth angle θ4 of 90 degrees.

The rotor core 220 includes an inner diameter portion core 221, a plurality of outer diameter portion cores 223, and a plurality of bridges 225.

The inner diameter portion core 221 is formed in an annular ring shape having a shaft through hole 221a into which a shaft 210 is inserted.

A plurality of outer diameter portion cores 223 are arranged along the circumferential direction (tangential direction) of the inner diameter portion core 221 on an outer circumferential surface of the inner diameter portion core 221, and spaced apart from each other to form permanent magnet insertion portions 223a for accommodating the arc type permanent magnets 230.

A first fixing protrusion 223b and a second fixing protrusion 223c protruding in an arc direction may be formed on both edge portions of the outer end of the outer diameter portion core 223. When the arc type permanent magnet 230 is inserted into the permanent magnet insertion portions 223a, the first and second fixing protrusions 223b and 223c serve to fix the position of the arc type permanent magnet 230, and when the rotor 200 rotates, the first and second fixing protrusions 223b and 223c serve to restrict the arc type permanent magnet 230 from scattering.

That is, the outer diameter portion core 223 has an open slot structure.

A plurality of bridges 225 are arranged along the circumferential direction of the inner diameter portion core 221 corresponding to each of the outer diameter portion core 223, and connects each of the outer diameter portion core 223 to the inner diameter portion core 221.

The outer diameter portion core 223 may be referred to as an outer core, and the inner diameter portion core 221 may be referred to as an inner core. This is because the inner diameter portion core 221 is positioned inside the outer diameter portion core 223 in the radial direction. Also, the outer diameter portion core 223 may be referred to as a yoke.

In the permanent magnet insertion portion 223a, the arc type permanent magnets 230 including an inner diameter portion 231 having a weak magnetic flux surface and an outer diameter portion 233 having a strong magnetic flux surface are disposed facing different sides from those adjacent to each other. Therefore, magnetic flux can be compensated and torque ripple can be reduced.

In a state where the arc type permanent magnet 230 is disposed, an air gap H1 partitioned by two adjacent bridges 225 in the circumferential direction of the inner diameter portion core 221 is formed at the lower end of the arc type permanent magnet 230, that is, between the first straight portion 235a and the inner diameter portion core 221 of the arc type permanent magnet 230.

The outer diameter portion core 223 includes a first side 223d in contact with an inner diameter portion 231 of a first arc type permanent magnet 230A among two arc type permanent magnets adjacent to each other, a second side 223e in contact with an outer diameter portion 233 of a second arc type permanent magnet 230B among the two arc type permanent magnets, and further includes a first incision 223f positioned at a lower end.

The first incision 223f is formed extending from an end portion of the second side 223e of the outer diameter portion core 223 toward the first side 223d.

And the bridge 225 includes a first side 225a extending from an end portion of the first side 223d of the outer diameter portion core 223 and connected to the inner diameter portion core 221 and a second side 225b positioned on the opposite side of the first side 225a and connected to the inner diameter portion core 221.

The second side 225b of the bridge 225 is positioned to be spaced apart from the end portion of the outer diameter portion 233 of the second arc type permanent magnet 230B toward the first side 223d of the outer diameter portion core 223.

Here, a lower end portion of the second arc type permanent magnet 230B may be the first straight portion 235a.

A separation distance D1 of the second side 225b of the bridge 225 may be set to various values.

According to this configuration, a portion of the first side 225a of the bridge 225 may contact at least a portion of the connecting portion 235 of the first arc type permanent magnet 230A, for example, the second straight portion 235b.

The first incision 223f may extend toward the first side 223d of the outer diameter portion core 223 from a point P1 where the first straight portion 235a of the arc type permanent magnet 230 and the lower end portion of the second side 223e of the outer diameter portion core 223 are connected.

As shown in the implementations of FIGS. 12 to 14, the first incision 223f extends toward the first side 223d of the outer diameter portion core 223 from a point P1 where the first straight portion 235a of the arc type permanent magnet 230 and the lower end portion of the second side 223e of the outer diameter portion core 223 are connected, but it may extend in parallel with at least a portion of the connecting portion 235 of the arc type permanent magnet 230, for example, the first straight portion 235a.

The second side 225b of the bridge 225 extends from the end portion of the first incision 223f and is connected to the inner diameter portion core 221.

The separation distance D1 of the second side 225b of the bridge 225 may be shorter than the length L7 of the first incision 223f.

In addition, a portion P2 where the second side 225b of the bridge 225 and the end portion of the first incision 223f are connected may be positioned radially outward the first straight portion 235a of the arc type permanent magnet 230.

And a maximum width W1 of the bridge 225 is formed smaller than a width W2 of the lower end portion of the outer diameter portion core 223.

In order to effectively reduce the leakage flux amount, the first incision 223f and the second side 225b of the bridge 225 can form a right or acute fifth angle θ5.

In the implementation shown in FIGS. 12 to 14, the first incision 223f and the second side 225b of the bridge 225 form an acute angle.

According to this configuration, as shown in FIG. 14, due to the first incision 223f provided at the lower end portion of the outer diameter portion core 223, the second side 225b of the bridge 225 is positioned to be spaced apart from the outer diameter portion 233 of the arc type permanent magnet 230B toward the first side 223d of the outer diameter portion core 223.

Therefore, since the leakage path is relatively increased compared to the flux concentrate type rotor without the first incision, magnetic resistance is increased, and since the magnetic flux is bent and flows due to the first incision 223f, the leakage flux through the bridge 225 is reduced.

In addition, since the arc type permanent magnet is used, the magnetic flux and efficiency are increased compared to the bar type permanent magnet, and even if the open slot structure is adopted, the mechanical rigidity of the rotor core increases as the force of magnet scattering is effectively dispersed compared to the bar type permanent magnets.

Hereinafter, a rotor core provided in a flux concentrate type rotor according to another implementation of the present disclosure will be described.

In the description of the following implementation, the same reference numerals are assigned to the same components as those of the first implementation described above, and detailed descriptions thereof are omitted.

Figure 15:
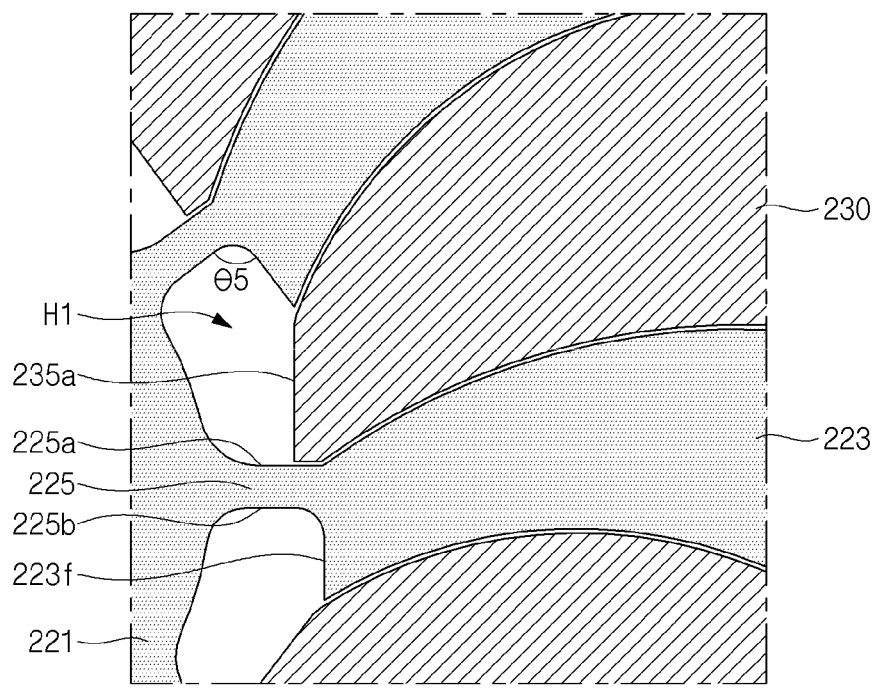
FIG. 15 is a diagram showing a schematic configuration of a rotor core provided in a flux concentrate type motor according to a second implementation of the present disclosure.

FIG. 15 is a diagram showing a schematic configuration of a rotor core provided in a flux concentrate type motor according to a second implementation of the present disclosure.

In the implementation shown in FIG. 15, the first incision 223f is formed by bending toward the inner diameter portion core 221 compared to the first implementation described above.

That is, in the first implementation described above, the first incision 223f extends from the first straight portion 235a of the arc type permanent magnet 230, but a configuration extending in parallel with at least a part of the connecting portion 235 of the arc type permanent magnet 230, for example, the first straight portion 235a is adopted.

However, as in the present implementation, the first incision 223f may be formed by bending toward the inner diameter portion core 221 compared to the first implementation described above.

In the case of the present implementation, a fifth angle θ5 between the first incision 223f and the second side 225b of the bridge 225 forms a substantially right angle.

According to the experiment conducted by the present inventors, since it is desirable to increase the leakage path in order to effectively improve the back electromotive force, it was found that it is desirable to form a small fifth angle θ5 formed between the first incision 223f and the second side 225b of the bridge 225.

Figure 16:
FIG. 16 is a diagram showing a schematic configuration of a rotor core provided in a flux concentrate type motor according to a third implementation of the present disclosure.

FIG. 16 is a diagram showing a schematic configuration of a rotor core provided in a flux concentrate type motor according to a third implementation of the present disclosure.

The outer diameter portion core provided in the flux concentrate type rotor of this implementation further includes a second incision 223g extending outward in a radial direction from an end portion of the first incision 223f extending in parallel with at least a portion of the connecting portion 235 of the arc type permanent magnet 230, for example, the first straight portion 235a, and the second side 225b of the bridge 225 extends from the end portion of the second incision 223g and is connected to the inner diameter portion ore 221.

The fifth angle θ5 between the second incision 223g and the second side 225b of the bridge 225 forms an acute angle, and a portion P3 where the second side 225b and an end portion of the second incision 223g are connected is positioned outside the first straight portion 235a of the arc type permanent magnet 230 in the radial direction.

Accordingly, since the flux concentrate type rotor of the present implementation has a relatively increased leakage path compared to the first and second implementations of the present disclosure, the back electromotive force can be further improved.

Figure 17:
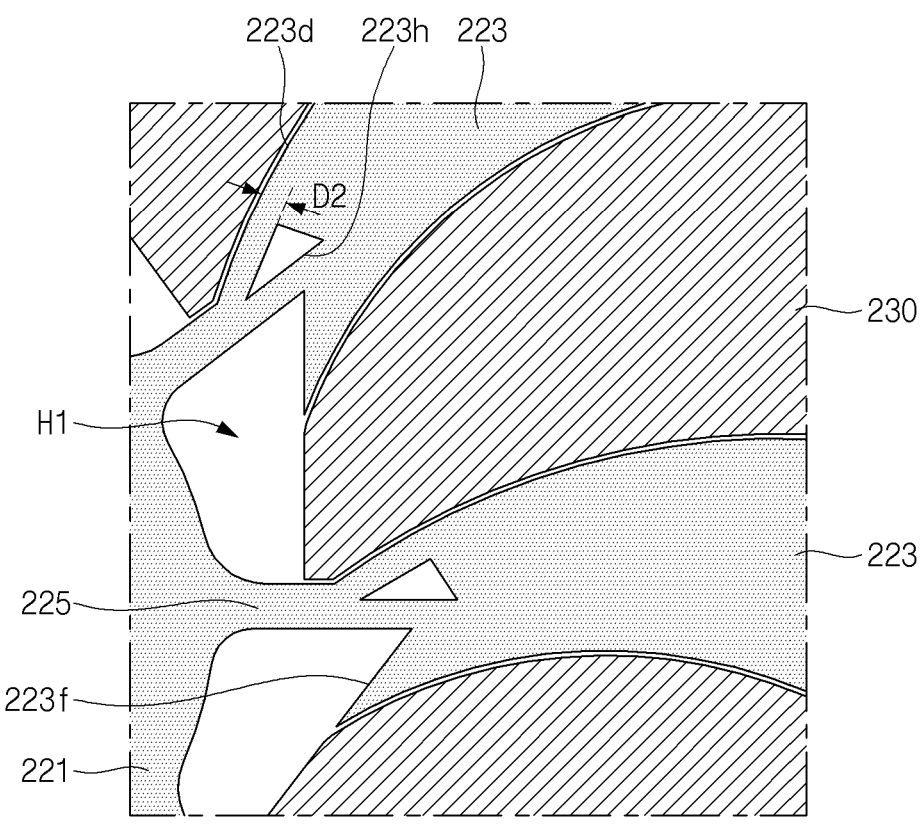
FIG. 17 is a diagram showing a schematic configuration of a rotor core provided in a flux concentrate type motor according to a fourth implementation of the present disclosure.

FIG. 17 is a diagram showing a schematic configuration of a rotor core provided in a flux concentrate type motor according to a fourth implementation of the present disclosure.

The rotor core provided in the flux concentrate type rotor of the present implementation discloses a configuration in which a hole 223h is formed in the outer diameter portion core 223 of the rotor core of the first implementation described above to generate local saturation at the lower end portion of the outer diameter portion core 223.

In order to effectively generate local saturation on the leakage path of the outer diameter portion core 223, a distance D2 between the first side 223d of the outer diameter portion core 223 and the hole 223h is preferably maintained at about 0.5 mm.

Meanwhile, the hole 223h can also be applied to the outer diameter portion core provided in the other implementations described above.

In addition, in the case of the flux concentrate type motor to which the arc type permanent magnet is applied, the shape design of the permanent magnet is also important, but how to arrange the arc type permanent magnet on the rotor core is also an important design factor.

Figure 18:
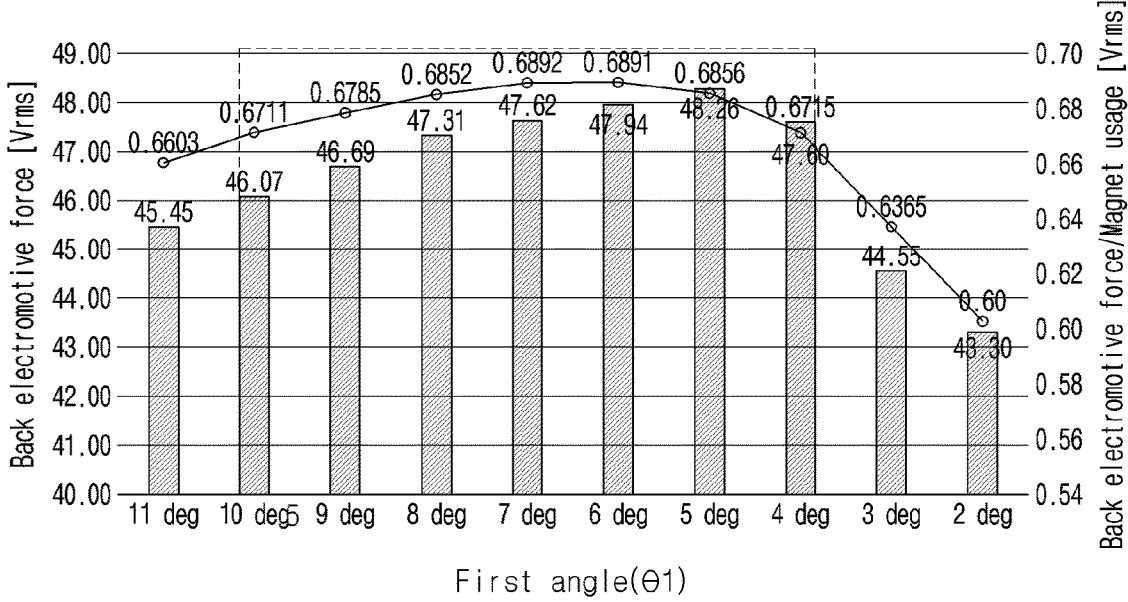
FIG. 18 is a graph showing a magnitude of a back electromotive force and a back electromotive force per magnet usage according to a change in a first angle.

FIG. 18 is a graph showing a magnitude of a back electromotive force and a back electromotive force per magnet usage according to a change in a first angle.

Figure 19:
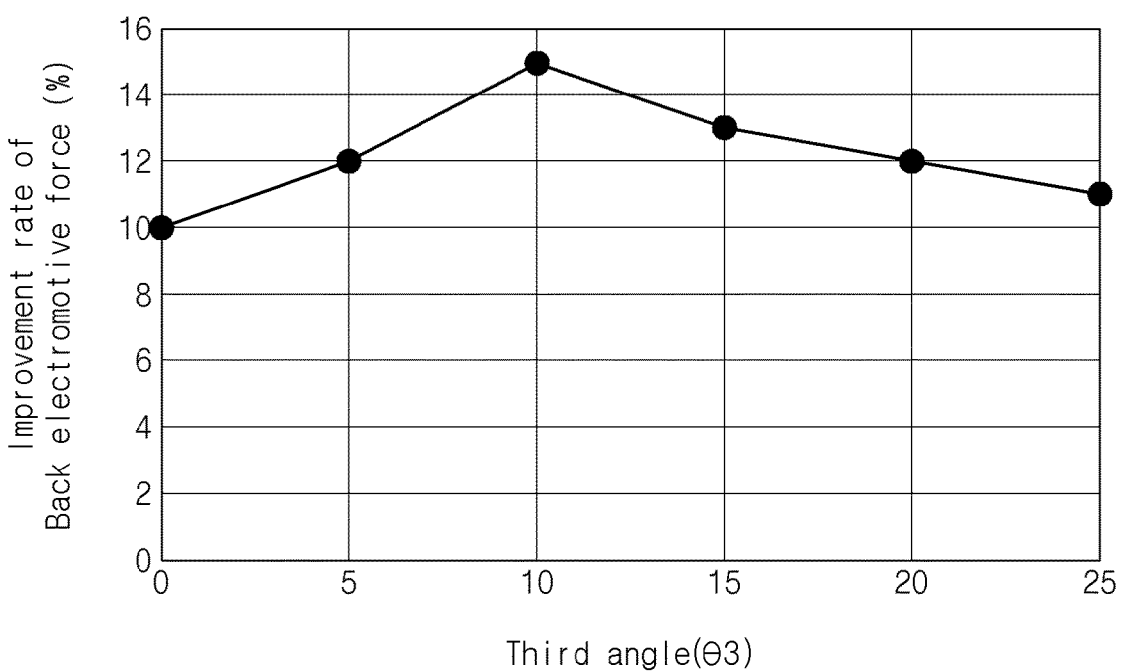
FIG. 19 is a graph showing an improvement rate of a back electromotive force according to a change in a third angle.

And FIG. 19 is a graph showing an improvement rate of a back electromotive force according to a change in a third angle.

First, referring to FIGS. 12 and 18, in the case of a 10-pole motor, it can be seen that the arc type permanent magnet 230 can obtain excellent back electromotive force and back electromotive force per magnet usage when the first angle θ1 between a first extension line L1 and a second extension line L2 satisfies 4° to 10°.

Here, the first extension line L1 refers to a line connecting a center C1 of the arc type permanent magnet 230 and the center of the inner diameter portion core 221, and the second extension line L2 refers to a line connecting a center C2 of the outer arc of the outer diameter portion core 223 and the center of the inner diameter portion core 221.

Also, the center C1 of the arc type permanent magnet 230 refers to a center in the width direction and a center of the thickness direction of the arc type permanent magnet, and the center C2 of the outer arc of the outer diameter portion core 223 refers to a center of the outer arc in the longitudinal direction.

Therefore, in order to form the first angle θ1 as 4° to 10°, the first angle θ1 may satisfy Equation (1) below:

$$\theta1 = k1 \times PA, \qquad (1)$$
$$PA = 360°/(2 \times P).$$

In the above Equation (1), k1 is 0.16 to 0.55, and P is the number of the poles of the permanent magnet.

And the width B of the arc type permanent magnet 230 may satisfy Equation (2) below:

$$B = k2 \times B' \ (k2 \text{ is } 0.5 \text{ to } 0.75, \text{ and } B' \text{ is a radius of the rotor core}). \quad (2)$$

The second angle θ2 formed between a third extension line L3 and a fourth extension line L4 may satisfy Equation (3) below:

$$\theta2 = k3 \times PA, \qquad (3)$$
$$PA = 360°/(2 \times P).$$

In the above Equation (3), k3 is 0.7 to 0.9, and P is the number of the poles of the permanent magnet.

Here, the third extension line L3 refers to a line connecting a center C3 of the inner diameter portion 231 and a center of the inner diameter portion core 221, and the fourth extension line L4 refers to a line connecting a center C4 of the outer diameter portion 233 and a center of the inner diameter portion core 221.

And the center C3 of the inner diameter portion 231 refers to a center of the longitudinal direction of the inner diameter portion 231, and the center C4 of the outer diameter portion 233 refers to a center of the outer diameter portion 233 in the longitudinal direction.

Next, referring to FIGS. 12 and 19, in the case of a 10-pole motor, when the arc type permanent magnet 230 is inserted into a permanent magnet insertion part so that the third angle θ3 of 5° to 20° is maintained between a fifth extension line L5 and a sixth extension line L6, it can be seen that the back electromotive force improvement rate is excellent.

Here, the fifth extension line L5 refers to a line connecting a center C5 of the first straight portion 235a formed at one end portion of the arc type permanent magnet 230 from the center of the inner diameter portion core 221, and the sixth extension line L6 refers to a line connecting a center C6 of the first straight portion 235a formed at the other end portion of the arc type permanent magnet 230 from the center of the inner diameter portion core 221.

Although all of the first angle θ1, the second angle θ2, and the third angle θ3 are shown in FIG. 12, the flux concentrate type motor of the present disclosure may be based on the fact that the first angle θ1 satisfies Equation (1), and may further satisfy at least one of the conditions of the second angle θ2 and the third angle θ3.

It is apparent to those skilled in the art that the present disclosure may be embodied in other specific forms without departing from the essential characteristics of the present disclosure. Accordingly, the above detailed description should not be construed as restrictive in all respects but should be considered as illustrative. The scope of the present disclosure should be determined by reasonable interpretation of the appended claims, and all changes within the equivalent scope of the present disclosure are included in the scope of the present disclosure.

What is claimed is:

1. A flux concentrate type motor comprising:
a rotor core including an inner diameter portion core, a plurality of outer diameter portion cores, and a bridge connecting the plurality of outer diameter portion cores to the inner diameter portion core; and
an arc type permanent magnet inserted between two adjacent outer diameter portion cores of the plurality of outer diameter portion cores,
wherein a first angle θ1 defined between a first extension line and a second extension line satisfies E(1):

$$\theta1 = k1 \times PA, \qquad (1)$$

$$PA = 360°/(2 \times P),$$

where k1 is 0.16 to 0.55, and P is a number of pole of the arc type permanent magnet,
wherein the first extension line connects a center of each of the arc type permanent magnet with a center of the inner diameter portion core, and
wherein a second extension line connects a center of an outer arc of each of the plurality of outer diameter portion cores with the center of the inner diameter portion core.

2. The flux concentrate type motor of claim 1, wherein the first angle θ1 is between 4° and 10°.

3. The flux concentrate type motor of claim 2, wherein a width B of the arc (2):

$$B = k2 \times B' \ (k2 \text{ is } 0.5 \text{ to } 0.75, \text{ and } B' \text{ is a radius of the rotor core}). \quad (2)$$

4. The flux concentrate type motor of claim 3, wherein the arc type permanent magnet includes:
an inner diameter portion having a first curvature;
an outer diameter portion having a second curvature different from the first curvature; and
a connecting portion connecting an end portion of the inner diameter portion to an end portion of the outer diameter portion,
wherein a second angle θ2 defined between (i) a third extension line connecting the center of the inner diameter portion and the center of the inner diameter portion core and (ii) a fourth extension line connecting a center of the outer diameter portion and the center of the inner diameter portion core satisfies E(3):

$$\theta2 = k3 \times PA, \qquad (3)$$

$$PA = 360°/(2 \times P),$$

where k3 is 0.7 to 0.9, and P is a number of pole of the arc type permanent magnet.

5. The flux concentrate type motor of claim 4, wherein the connecting portion includes:

a first straight portion connected to the end portion of the outer diameter portion; and a second straight portion connecting an end portion of the first straight portion with the end portion of the inner diameter portion, and wherein a third angle $\theta3$ of 5° to 20° is maintained between (i) a fifth extension line connecting a center of the first straight portion formed at an end portion of the arc type permanent magnet from the center of the inner diameter portion core and (ii) a sixth extension line connecting the center of the first straight portion formed at an opposite end portion of the arc type permanent magnet from the center of the inner diameter portion core.

6. The flux concentrate type motor of claim 5, wherein the arc type permanent magnet includes a first arc type permanent magnet and a second arc type permanent magnet that are adjacent to each other, Wherein each of the plurality of outer diameter portion cores includes:

a first side that contacts an inner diameter portion of the first arc type permanent magnet, a second side that contacts an outer diameter portion of the second arc type permanent magnet positioned at an opposite side of the first side, and a first incision positioned at a lower end portion, and wherein the first incision extends from an end portion of a second side of each of the plurality of outer diameter portion cores toward the first side.

7. The flux concentrate type motor of claim 6, wherein the bridge includes:

a first side extending from an end portion of a first side of each of the plurality of outer diameter portion cores and connected to the inner diameter portion core; and a second side opposite to the first side of the bridge and connected to the inner diameter portion core.

8. The flux concentrate type motor of claim 7, wherein the second side of the bridge is spaced apart from an end portion of the outer diameter portion of the second arc type permanent magnet toward the first side of each of the plurality of outer diameter portion cores.

9. The flux concentrate type motor of claim 8, wherein a portion of the first side of the bridge contacts at least a portion of a connecting portion of the first arc type permanent magnet.

10. The flux concentrate type motor of claim 9, wherein the first incision extends toward the first side of each of the plurality of outer diameter portion cores from a portion where a first straight portion of the first arc type permanent magnet and a lower end portion of the second side of each of the plurality of outer diameter portion cores are connected.

11. The flux concentrate type motor of claim 10, wherein the second side of the bridge extends from an end portion of the first incision and is connected to the inner diameter portion core.

12. The flux concentrate type motor of claim 11, wherein a portion where the second side of the bridge and the end portion of the first incision are connected is positioned radially outward from the first straight portion of the first arc type permanent magnet.

13. The flux concentrate type motor of claim 11, wherein the first incision and the second side of the bridge define an acute angle.

14. The flux concentrate type motor of claim 11, wherein the first incision is parallel to at least a portion of the connecting portion of the first arc type permanent magnet.

15. The flux concentrate type motor of claim 10, wherein each of the plurality of outer diameter portion cores further includes a second incision extending radially outward from the end portion of the first incision.

16. The flux concentrate type motor of claim 15, wherein the second side of the bridge extends from an end portion of the second incision and is connected to the inner diameter portion core.

17. The flux concentrate type motor of claim 16, wherein a portion where the second side of the bridge and the end portion of the second incision are connected is positioned radially outward from the first straight portion of the first arc type permanent magnet.

18. The flux concentrate type motor of claim 17, wherein the second incision and the second side of the bridge define an acute angle.

19. The flux concentrate type motor of claim 17, wherein the first incision is parallel to at least a portion of the connecting portion of the arc type permanent magnet.

20. The flux concentrate type motor of claim 4, wherein the arc type permanent magnet satisfies at least one of Equations (4)-(8):

$$A = k4 \times C(k4 \text{ is } 0.31 \text{ to } 0.37), \qquad (4)$$

$$B = k5 \times A(k5 \text{ is } 2.9 \text{ to } 3.75), \qquad (5)$$

$$B = k6 \times E(k6 \text{ is } 1.8 \text{ to } 2.7), \qquad (6)$$

$$D = k7 \times C(k7 \text{ is } 0.62 \text{ to } 0.98), \text{ and} \qquad (7)$$

$$M = (C/D) \times A/(C - D)(M \text{ is greater than or equal to } 2.5), \qquad (8)$$

where A is a thickness of the arc type permanent magnet, B is a width of the arc type permanent magnet, C is a first curvature of the inner diameter portion, D is a second curvature of the outer diameter portion, and E is a magnetization center point gap.

\* \* \* \* \*